April 3, 1945. J. C. BOYD 2,372,761
METHOD OF MAKING PLASTICS
Filed Sept. 15, 1941

INVENTOR;
JOHN C. BOYD
BY Kingsland, Rogers & Ezell
ATTORNEYS

Patented Apr. 3, 1945

2,372,761

UNITED STATES PATENT OFFICE 2,372,761

METHOD OF MAKING PLASTICS

John C. Boyd, Clayton, Mo.

Application September 15, 1941, Serial No. 410,882

7 Claims. (Cl. 41—17)

This invention relates to a method of treating plastic materials. In particular, it relates to a surface treatment method by means of which certain unusual and desirable appearance effects as well as other surface characteristics may be obtained.

Briefly, the invention comprises a heat treatment that may be effected, for example, by a flame or by hot air directed upon the surface of certain plastic materials, which treatment results in various color effects, texture effects, and degrees of translucency or opacity on the surface treated, these effects and degrees of translucency being controlled by and dependent upon the contour of the surface treated, the manner of application of the treatment, and the color and composition of the material being treated.

It is an object of the invention to provide a method for obtaining a plastic material, having one or more of the following characteristics, to-wit: gradation of color, gradation of color brilliance or shade, gradation of translucency, contrast of color, contrast of color brilliance or shade, contrasting degrees of translucency, opacity, opacity at some points and translucency at others, attractiveness of surface texture, a surface that due to its texture appearance does not readily show scratches.

More specifically, it is an object of the invention to produce upon a more or less translucent plastic material of one or more basic colors a surface that is at least in part opaque or tends toward opacity, and especially a surface that, though it retains its original color hue, tends toward whiteness where it is opaque or where it tends toward opacity. Also, it is an object of the invention to produce upon an opaque plastic material of one or more basic colors a surface that in part or throughout tends toward whiteness while still retaining its original color hue.

It is an object of the invention to provide a method for producing a texture of surface on plastic material of the nature of a fused surface, especially where the main body of the material has a more crystalline aspect, and particularly one that does not show scratching.

In the drawing—

Figure 1:
Fig. 1 is a view of an ornament prior to the surface treatment.
Figure 2:
Fig. 2 is a view of the ornament after the surface treatment.

The ornament of Figs. 1 and 2 is shown in Fig. 1 as having a main body portion 10 consisting of a figure holding a bow 11. In this case the surface of the figure is irregular to correspond with the various irregularities of the human form. The body of this ornament is made of a plastic material which is entirely translucent prior to treatment and is of the color of whatever dye is used in the material. The bow 11, however, is made of a plastic material which is entirely opaque prior to treatment. The bow 11 also may be made of a plastic of contrasting color to that used for the other parts of the ornament.

After the treatment to be described, the body 10 achieves, upon the upstanding or raised portions 12 of its surface, a lighter coloration tending somewhat toward white but still similar in color hue to the untreated material and in the deeper parts or declivities 13 upon the surface it retains a greater or lesser, and usually graduated, degree of its original translucency and darker coloration.

The bow 11, prior to the surface treatment of the material, is opaque and of the color of whatever dye is used in it. After the treatment to be described the figure 11 remains opaque throughout and achieves a lighter coloration similar in hue to the untreated material but tending somewhat toward white.

Figure 3:
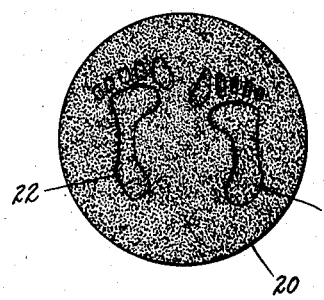
Fig. 3 is a view of another ornament prior to the surface treatment.
Figure 4:
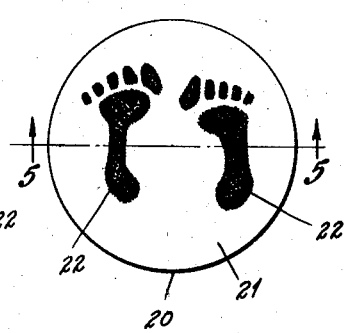
Fig. 4 is a similar view of the ornament in Fig. 3 after the surface treatment.
Figure 5:
Fig. 5 is a section on the line 5—5 of Fig. 4.

In the ornament of Figs. 3, 4, and 5 the device is shown as a disc 20 having a main raised surface 21, with indented portions 22 therein, here represented as footprints.

Before the treatment the whole object is translucent. After the treatment, the surface portion 21 becomes opaque, and whitish, but tinted with the original color. The treatment does not affect the indentations 22, so that the appearance is of dark and translucent footprints contrasted with a lighter and opaque surface. In Fig. 5 the surface portion after the treatment is indicated by the portion 23, somewhat exaggerated as to thickness. Actually, the surface portion probably extends somewhat irregularly into the material, too.

It may be noted that in Fig. 5 the back is translucent, as it is not treated. Therefore, if light is directed against the back of this object it will shine through only where the front is untreated and therefore translucent. By this method attractive and colorful illuminated signs and display pieces may be produced. Likewise illumination may be used to secure attractive effects with figures produced by the techniques illustrated in Figs. 2 and 7.

Figure 6:
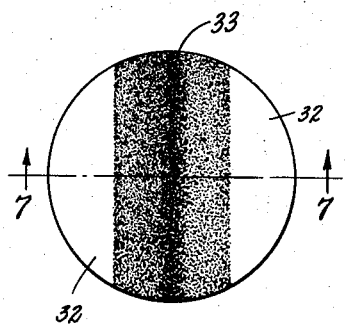
Fig. 6 is a view of a different piece of material formed of two separate pieces.
Figure 7:
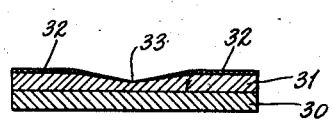
Fig. 7 is a section on the line 7—7 of Fig. 6.

In the design shown in Figs. 6 and 7, there is shown a first portion 30 of a plastic of predetermined color superimposed over which is an additional layer 31 of a different, and preferably lighter color of plastic material, such as the whitish translucent plastic familiar in the art. After the treatment has been applied to the upper surface of the portion 31 and to a varying degree to the V-shaped groove—that is, more at the higher portion of the groove, less at the medium high portions of the groove and none at the bottom portions of the groove—the result is that the color of the lower or first piece of plastic shows through with varying intensity determined by the degree of translucency at each point on the surface of the upper portion 31. The degree of translucency is a function of the thickness of the portion 31 and of the extent of the surface treatment producing the opaque or partially opaque parts 32. Thus, it will not show through on surface 32 and will show through with greater intensity at the bottom of the V wedge 33 and with lesser intensity toward the top part of V wedge 33.

The method of attaining the foregoing surface effects involves the use of plastic materials which are molded by one of the known methods, particularly where there is present within the material or on its surface some material such as one of the solvents used in connection with the plastic material to be treated.

One way of forming a plastic material which is suitable for this method of surface treatment is to mix what is known as hard compression Lucite powder having a trade number of H-7500 HG-1 with an equal volume of a solvent such as acetone. Other solvents may be used, such as, for instance, methyl ethyl ketone and other like ketones, or ethyl acetate. The solvent will cause the various particles of powder to fuse. At first the solvent will evaporate to a point where the mass will feel soft and rubbery. Within twenty-four to forty-eight hours, under ordinary atmospheric conditions, it will become hard to the touch. At this time or later it is best to make the heat application to the surface. Heat application is then made to the surface, as by a flame or by heated air, or other means, until the surface is melted or fused. If a flame is used a clean flame is preferable, such as that produced by gas or alcohol, as it does not produce deposits of foreign matter. Any solvent or other volatile matter that might be present on the surface tends to burn away with the application of the flame or heated air. However, the heat applied is not great enough, during the short period of application, to burn or destroy the basic plastic at the surface, but rather the basic plastic at the surface is fused or melted to some extent. The melting or fusing occurs on the more exposed surfaces sooner than it does on the surfaces that are below the level of these more exposed surfaces. The plastic object may be withdrawn from the flame or heat in such time as to leave the proper portions of the surface such as 13, 22, or 33 unaffected, and to limit the result to a melting and fusing of the materials at the surface, rather than burning them by complete combustion. The end point of the melting or fusing may be recognized by observing the appearance of the surface of the material.

It is noted that the melted or fused surfaces have an opaque or whitish appearance, whereas the unmelted or unfused and lesser melted or fused portions of the surface retain their darker and translucent quality.

If the dye color is added to the powder solvent mixture and subsequently the material is fused or melted at the surface, then the result is similar to the above and the fused or melted surfaces have an opaque and whitish appearances but still retain the color hue of the dye color used.

In an ornament such as in Fig. 2 the effect is that of a patina. In Fig. 4, the effect is simply two contrasting surfaces. The type of Fig. 4 may be used for lettering with the result of having either the letters themselves cut into the background, or the background cut away from the letters, so that the letters stand out by contrast in color.

In order to achieve a highly polished surface, a slight abrasion is performed on the treated portion, and then a polish may be added by a waxed-wheel, tumbling barrel, or similar polishing means. The addition of a lacquer applied before polishing gives a very highly polished effect. Polishing without the abrasion gives a more rugged appearance. Another effect may be produced by abrasions without either lacquering or polishing, and for some purposes it is unnecessary to abrade, polish, or lacquer.

In the foregoing method, the shading and patina effect may be obtained, two-toned effects may be obtained, and lettering which contrasts in color with its background may be produced. Figures and characters may be embodied into the surface, both in the positive and the negative.

Another effect may be obtained by retarding the flame or heated air from certain parts of the surface and applying the process to other parts, as by directing the flame, which method produces an effect such as that of clouds on the surface of the material. This may also be accomplished by masking out certain parts, designs, or figures with a nonburning material.

It is not definitely known that chemical changes take place during the process. The basic plastic material is at the start granular in the sense that it is made up of small particles. The amount of solvent added is not sufficient to dissolve completely all of the particles of the granular plastic, but merely acts upon the surface of the particles, so that adjacent particles may become fused together. The solvent used is one that may evaporate sufficiently readily so that the particles do not have time to become completely dissolved, but, at the same time, is one that will enable the particles to be bound together to form a solid mass. The ultimate product before application of the surface process will have a surface texture more or less irregular and porous with interstices between adjacent grains.

During the application of heat, the surface is fused or melted to some extent without being destroyed. The principal variables of the heat application are time and intensity of the heat. These are adjusted so that the destruction does not occur. Ideally, the process comprises application of intense heat for a short period. An optical inspection is sufficient to control this.

The plastic material employed is, therefore, one that is granular at the start and one which is subject to partial dissolving in a suitable solvent. It is likewise one that, having been molded with a suitable solvent, is subject to the fusing action at the surface upon the application of heat, so that the surface texture may be altered from the relatively rough granular type to the more smooth fused type in the end product. But the plastic must not be readily inflammable, lest it burn to disintegration, although it must be one subject to slow burning to attain the fusing effect. The solvent is preferably inflammable, because it aids in the fusing action, and comprises a flame carrying medium when the heat is applied by a flame.

Thus the mentioned plastics and solvent are intended to be merely illustrative. The facts of granularity, solubility, capacity for slow burning, and fusibility as characteristics of plastic materials are well known in the art as applied to all plastic material. Likewise, the dissolving power, volatility, and the inflammability of solvents are qualities known for all solvents. Knowing the desired qualities, the process of this application itself becomes more a mechanical process than a chemical one.

In short, knowing the properties of individual plastic materials and individual solvents, the process may be employed to give the desired surface coloration and texture without experimentation. The surface resulting also will have an increased resistance to further burning and an increased resistance to wear which may be termed greater hardness.

The effect of the process is to produce a surface effect, without materially altering internal parts of the material, and this is accomplished by a controlled application of heat to determined parts of the surface.

What is claimed is:

1. In a process of producing surface effects on plastic material, the steps of providing a lower or first piece of plastic material of one color, annexing thereto an upper or second piece of translucent plastic material of different color, said second piece having an inner surface joined to the first piece, and an irregular outer surface, thereafter heat-treating the irregular outer surface of the second piece of plastic material to cause at least a part of said treated surface to lose at least part of its translucency, and to attain a color in contrast with that of the untreated portion, with the result that the color of the lower or first piece of plastic shows through with varying intensity determined by the degree of translucency at each point on the treated upper or first piece of plastic, and thereafter stopping said heat treatment.

2. The process of producing surface effects upon plastic material, including the steps of providing a piece of plastic material incorporating a dye and an inflammable solvent, providing an irregular surface on said material having portions in relief and declivities among said portions in relief, burning the inflammable materials upon the surface of said portions in relief and to cause them to change in color, while restricting the burning within the declivities, and checking the burning before destruction of the plastic material of said surface.

3. The process of producing a fused surface on a piece of plastic material of generally crystalline nature, including the steps of applying to said plastic material at the location of said desired surface an inflammable material, causing said material to burn until said surface has fused, and stopping said burning prior to disintegration of the material at said surface.

4. The process of producing plastic material having contrasting surface effects, comprising the steps of providing a piece of translucent plastic material having opposed surfaces, providing on one opposite surface demarcations, also providing on said surface an inflammable material, causing burning of said inflammable material, while restricting the burning away from the demarcations and away from the other side, and checking the burning after the portion being burned has been caused to lose at least part of its translucency.

5. The process of producing color effects on plastic material, comprising producing a piece of plastic material of desired basic color subject to change in color upon application of heat, providing an irregular surface thereon having indentations and relief portions, applying heat only to the portions in relief until the surfaces of said relief portions have changed color, to obtain an article having the basic color in the indentations and the changed color on the relief portions.

6. The process of producing color effects on plastic material, comprising producing a piece of plastic material of desired basic color and subject to change in color quality upon application of heat, producing a surface area thereon having indentations and relief portions, applying a flame to said surface portion to effect color change on the relief portions, while limiting and controlling the application of said flame to prevent such changes in said indentations.

7. The process of producing plastic articles including producing a plastic piece of material subject to change in color effect upon application of heat thereto, providing a surface thereon having contours shaped in varying relief to provide a pictorial design, applying a flame to said surface for a limited period until the highest portions in relief become changed in color, while the bottoms of the indentations remain substantially unchanged, and the portions therebetween are graded in color between said highest and bottom portions.

JOHN C. BOYD.